US012626939B2

(12) United States Patent
MacDonald

(10) Patent No.: US 12,626,939 B2
(45) Date of Patent: May 12, 2026

(54) EMERGENCY POWER UNITS

(71) Applicant: Hamilton Sundstrand Corporation, Charlotte, NC (US)

(72) Inventor: Malcolm P. MacDonald, Bloomfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 652 days.

(21) Appl. No.: 18/161,728

(22) Filed: Jan. 30, 2023

(65) Prior Publication Data
US 2024/0258540 A1     Aug. 1, 2024

(51) Int. Cl.
| | |
|---|---|
| *H01M 8/04225* | (2016.01) |
| *B60L 50/60* | (2019.01) |
| *B60L 50/70* | (2019.01) |
| *B60L 58/33* | (2019.01) |
| *B64D 27/24* | (2006.01) |
| *H01M 8/04007* | (2016.01) |
| *H01M 8/04111* | (2016.01) |
| *H01M 16/00* | (2006.01) |

(52) U.S. Cl.
CPC ......... *H01M 8/04225* (2016.02); *B60L 50/60* (2019.02); *B60L 50/70* (2019.02); *B60L 58/33* (2019.02); *B64D 27/24* (2013.01); *H01M 8/04067* (2013.01); *H01M 8/04111* (2013.01); *H01M 16/006* (2013.01); *B60L 2200/10* (2013.01); *B64D 2221/00* (2013.01); *H01M 2250/20* (2013.01)

(58) Field of Classification Search
CPC ......... H01M 8/04225; H01M 8/04067; H01M 8/04111; H01M 16/006; B60L 50/60; B60L 50/70; B64D 27/24
USPC ......................................................... 429/429
See application file for complete search history.

(56) References Cited

U.S. PATENT DOCUMENTS

| | | | |
|---|---|---|---|
| 6,641,084 B1 | 11/2003 | Huber et al. | |
| 10,814,992 B2 | 10/2020 | Halsey et al. | |
| 10,913,543 B2 | 2/2021 | Bailey et al. | |
| 11,508,979 B2 | 11/2022 | Miftakhov et al. | |
| 2012/0161512 A1 | 6/2012 | Metzler et al. | |
| 2016/0159492 A1* | 6/2016 | Filangi, Jr. ............. | B64D 41/00 244/58 |
| 2018/0141674 A1 | 5/2018 | Bailey et al. | |
| 2021/0009280 A1* | 1/2021 | Poirier ................... | B64D 41/00 |

OTHER PUBLICATIONS

European Search Report dated Apr. 24, 2024 in connection with European Patent Application No. 24154838.7, 7 pages.
Communication pursuant to Article 94(3) EPC issued Nov. 24, 2025, in connection with European Patent Application No. 24 154 838.7, 6 pages.

* cited by examiner

*Primary Examiner* — James M Erwin

(57) ABSTRACT
In accordance with at least one aspect of this disclosure, an emergency power unit system for an aircraft includes, a fuel cell system configured to generate power using a fuel and an oxidizer and to supply electrical power to an aircraft electrical bus in at least a fuel cell operational mode. An electrical storage is operatively connected to the aircraft electrical bus and directly connected to the fuel cell system to provide electrical power to the aircraft electrical bus and to the fuel cell system in a fuel cell start up mode.

20 Claims, 1 Drawing Sheet

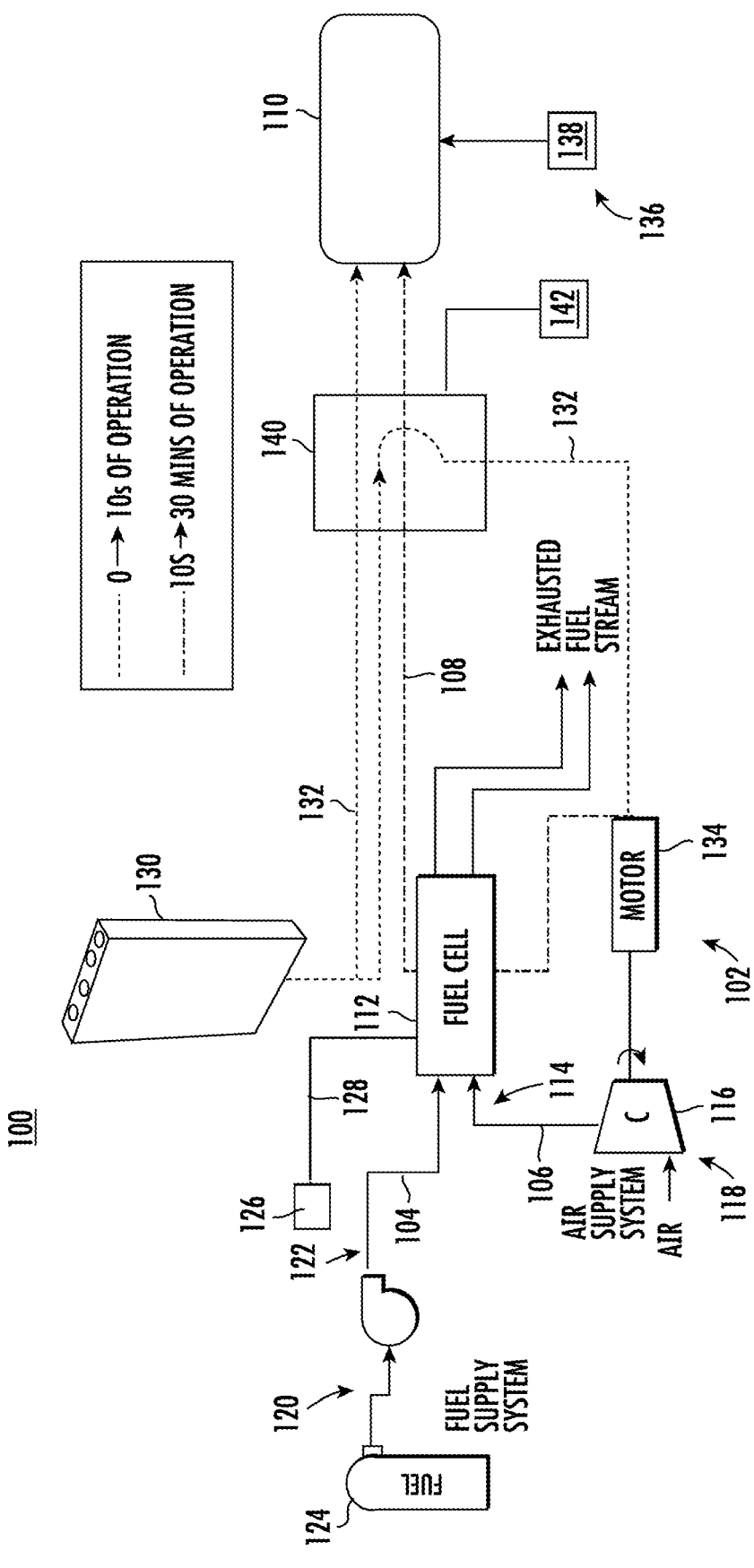

EMERGENCY POWER UNITS

TECHNICAL FIELD

The present disclosure relates to emergency power units (e.g., for aircraft).

BACKGROUND

Typical emergency power units use a ram air turbine to generate power in an emergency. A fuel cell may be used as an emergency power unit over a ram air turbine, however, fuel cells require a supply of air and fuel to produce power, both of which are typically driven by a turbomachine (compressor, fan, or pump). In such instances, the response time of the turbomachine to reach its design pressure can lag behind the response time required for starting an emergency power unit.

There is always a need in the art for improvements to emergency power units in the aerospace industry, and in particular, systems and methods for starting said emergency power units. This disclosure provides a solution for this need.

SUMMARY

In accordance with at least one aspect of this disclosure, an emergency power unit system for an aircraft includes, a fuel cell system configured to generate power using a fuel and an oxidizer and to supply electrical power to an aircraft electrical bus in at least a fuel cell operational mode. An electrical storage is operatively connected to the aircraft electrical bus and directly connected to the fuel cell system to provide electrical power to the aircraft electrical bus and to the fuel cell system in a fuel cell start up mode. In the fuel cell start up mode, the electrical storage can be configured to instantaneously provide electrical power to the aircraft electrical bus and to instantaneously provide electrical power to a starter motor of the fuel cell system to start the fuel cell system.

The fuel cell system can include a fuel cell fluidly connected to an oxidizer supply line to receive the oxidizer and a compressor configured to receive the oxidizer and compress the oxidizer upstream of the fuel cell. The starter motor of the fuel cell system can be operatively connected to the compressor to drive the compressor for a first duration. The first duration can be a duration for the compressor to start and reach operational speed. In embodiments, the fuel cell can be or include a proton exchange membrane fuel cell. In certain embodiments, the fuel cell system may not include a solid oxide fuel cell.

In embodiments, in the fuel cell operational mode, only the fuel cell system can be configured to supply electrical power to the aircraft bus alone. In embodiments, in a parallel mode, after the first duration is reached, the electrical storage and the fuel cell system can be configured to provide electrical power to the aircraft electrical bus in parallel for a second duration.

In embodiments, the system can include a switching module and a controller configured to switch between the fuel cell start up mode, the fuel cell operational mode and the parallel mode. In embodiments, switching from the fuel cell start up mode to the fuel cell operational mode can include disconnecting the electrical storage from the aircraft electrical bus when the first duration is reached so that only the fuel cell system provides power to the aircraft electrical bus. In embodiments, switching from the fuel cell start up mode to the parallel mode can include continuing to provide power to the aircraft electrical bus with the electrical storage while also providing power to the aircraft electrical bus with the fuel cell system, regardless of whether the second duration is reached. In embodiments, switching from the parallel mode to the fuel cell operational mode can include disconnecting the electrical storage from the aircraft electrical bus when the second duration is reached so that only the fuel cell system provides power to the aircraft electrical bus.

In certain embodiments, the electrical storage can be a battery. In embodiments, the battery can be a standalone battery, isolated from a main aircraft battery system. In embodiments, the battery can be smaller than a main aircraft battery.

In embodiments, the system can include an oxidant supply system fluidly connected to the fuel cell system to supply the oxidant to the fuel cell system via the oxidant supply line. In embodiments, the system can further include a fuel supply system fluidly connected to the fuel cell system to supply the fuel to the fuel cell system via a fuel supply line. The fuel cell can be fluidly connected to the fuel supply line to receive the fuel. In embodiments, the fuel supply system can further include a fuel pump. In certain embodiments, the electrical storage can be operatively connected to provide electrical power to the fuel pump to power the fuel pump. A thermal management system can be in thermal communication with the fuel cell system to divert heat from the fuel cell system to the thermal management system.

In accordance with at least one aspect of this disclosure, a method can include supplying power from an electrical storage to an aircraft electrical bus and directly supplying power from the electrical storage to a fuel cell system to power the aircraft electrical bus and the fuel cell system before supplying power to the aircraft electrical bus with the fuel cell system.

In embodiments, the method can include switching between a fuel cell start up mode, a fuel cell operational mode and a parallel mode as a function of a state of the fuel cell system.

Switching from the fuel cell start up mode to the fuel cell operational mode can include disconnecting the electrical storage from the aircraft electrical bus when state of the fuel system is fully operational so that only the fuel cell system provides power to the aircraft electrical bus.

Switching from the fuel cell start up mode to the parallel mode can include continuing to provide power to the aircraft electrical bus with the electrical storage while also providing power to the aircraft electrical bus with the fuel cell system when a state of the fuel cell system is between start up and fully operational.

Switching from the parallel mode to the fuel cell operational mode can include disconnecting the electrical storage from the aircraft electrical bus when the state of the fuel cell is fully operational so that only the fuel cell system provides power to the aircraft electrical bus.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a schematic diagram of an emergency power unit in accordance with this disclosure, showing a system and method for supplying power to a load with the emergency power unit.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

In accordance with at least one aspect of this disclosure, an emergency power unit system 100 for an aircraft can be configured to operate in at least three modes, a fuel cell start up mode, a fuel cell operational mode, and a parallel mode to provide electrical power to one or more portions of an aircraft in an emergency. The emergency power unit system 100 can include a fuel cell system 102 configured to generate power using a fuel 104 and an oxidizer 106 and to supply electrical power 108 to an aircraft electrical bus 110 in at least the fuel cell operational mode. The fuel cell system 102 can include a fuel cell 112 fluidly connected to an oxidant supply line 114 to receive the oxidant 106 and a compressor 116 configured to receive the oxidant 106 and compress the oxidant 106 upstream of the fuel cell 112. In embodiments, the fuel cell 112 can be a proton exchange membrane fuel cell. In embodiments, the fuel cell system 102 may not include a solid oxide fuel cell.

In embodiments, the system 100 can include an oxidant supply system 118 fluidly connected to the fuel cell system 102 to supply the oxidant 106 to the fuel cell system 102 via the oxidant supply line 114. In embodiments, the system 100 can further include a fuel supply system 120 fluidly connected to the fuel cell system 102 to supply the fuel 104 to the fuel cell system 102 via a fuel supply line 122. The fuel cell 112 can be fluidly connected to the fuel supply line 122 to receive the fuel 104. In embodiments, the fuel supply system 120 can further include a fuel pump 124. A thermal management system 126 can be in thermal communication with the fuel cell system 102 to divert heat 128 from the fuel cell system 102 to the thermal management system 126.

An electrical storage 130 can be operatively (and/or selectively) connected to the aircraft electrical bus 110 and directly connected to the fuel cell system 102 to provide electrical power 132 to the aircraft electrical bus 110 and to the fuel cell system 102 in a fuel cell start up mode. As used herein, directly means connected without any intervening electrical components, such as power converters, electrical busses, or the like. In the fuel cell start up mode, the electrical storage 130 can be configured to instantaneously provide electrical power 132 to the aircraft electrical bus 110 and to instantaneously provide electrical power 132 to a starter motor 134 of the fuel cell system 102 to start the fuel cell 112. In certain embodiments, the electrical storage 130 can be operatively connected to provide electrical power to the fuel pump 124 to power the fuel pump 124. In certain embodiments, the electrical storage 130 can be or include a battery. In embodiments, the battery 130 can be a standalone battery, isolated from a main aircraft battery system 136. In embodiments, the battery 130 can be smaller than a main aircraft battery 138.

In embodiments, the system can include a switching module 140 (e.g., one or more contactors) and a control module 142 configured to switch between the fuel cell start up mode, the fuel cell operational mode and the parallel mode. The control module can be or include both hard wired circuits that cause a logic to be executed, and/or software-based components, for example, a CPU, a memory, machine readable instructions in the memory that when executed cause the CPU to perform a method. In certain embodiments, the control module automatically controls switching of the switching module 140 without user input. In certain embodiments, the system 100 can passively switch between modes, without any switching module or controller, for example switching only based on a state of charge of the electrical storage or the operational state of the fuel cell).

The starter motor 134 of the fuel cell system 102 can be operatively connected to the compressor 116 to drive the compressor 116 in at least the fuel cell start up mode for a first duration. The first duration can be a duration for the compressor 116 to start and reach operational speed to bring the fuel cell 112 online (e.g., about 10 seconds).

In embodiments, in the parallel mode, after the first duration is reached, the electrical storage 130 and the fuel cell system 102 can be configured to provide electrical power 108, 132 to the aircraft electrical bus 110 in parallel for a second duration. The second duration can be a duration for the fuel cell system 102 to reach peak power output (e.g., fuel cell operational state) and/or until the battery 130 is depleted (e.g., about 10 seconds to about 30 minutes of operation in this mode). In embodiments, in the fuel cell operational mode, only the fuel cell system 102 can be configured to supply electrical power 108 to the aircraft bus, e.g., without power 132 provided to the bus 110 from the electrical storage 130 or the aircraft battery system 136. The fuel cell operational mode can last for a third duration (e.g., until the emergency power unit is no longer needed, or until the fuel and oxidant are depleted).

In accordance with at least one aspect of this disclosure, a method (e.g., a method of operating the system 100 or a method for powering an aircraft in an emergency) can include supplying power from an electrical storage (e.g., electrical storage 130) to an aircraft electrical bus (e.g., bus 110) and directly supplying power from the electrical storage to a fuel cell system (e.g., fuel cell system 102) to power the aircraft electrical bus and the fuel cell system before supplying power to the aircraft electrical bus with only the fuel cell system. In embodiments, the method can include switching between the fuel cell start up mode, the fuel cell operational mode and the parallel mode as a function of a state of the fuel cell system, either actively or passively.

In the fuel cell start up mode, only the electrical storage provides power to the aircraft electrical bus, in addition to powering the starter motor of the fuel cell system to start the fuel cell system. At some time before the fuel cell is producing peak power, but while the fuel cell system is generating some power, the method can include switching from the fuel cell start up mode to the parallel mode. Switching from the fuel cell start up mode to the parallel mode can include continuing to provide power to the aircraft electrical bus with the electrical storage while also providing power to the aircraft electrical bus with the fuel cell system when the state of the fuel cell system is between start up and fully operational. The parallel mode can run until the fuel cell is fully operational and/or until the electrical storage is depleted.

Following the parallel mode, the method can include switching from the parallel mode to the fuel cell operational mode. Switching from the parallel mode to the fuel cell operational mode can include disconnecting the electrical storage from the aircraft electrical bus when the state of the fuel system is fully operational so that only the fuel cell system provides power to the aircraft electrical bus. Disconnecting can include disconnecting a contactor via the switching module (e.g., active switching), or disconnecting can be because the electrical is depleted and can therefore no longer provide electrical power to the bus (e.g., passive switching).

In certain embodiments, the system may switch directly from the fuel cell start up mode to the fuel cell operational mode, omitting the parallel mode. In this case, the method can include, switching from the fuel cell start up mode to the fuel cell operational mode, where switching includes disconnecting (e.g., as described above) the electrical storage from the aircraft electrical bus when the state of the fuel system is fully operational so that only the fuel cell system provides power to the aircraft electrical bus. This switch can be when the electrical storage is depleted.

A typical fuel cell emergency power unit requires a supply of air and fuel to produce power, both of which are typically driven by a turbomachine (compressor, fan, or pump). The response time of the turbomachine to reach its design pressure can be about 10 seconds, which means no power will be produced until after 10 seconds have elapsed. To meet safety regulations, an emergency power unit is required to deliver power in a much shorter duration, for example in less than about 5 seconds. Embodiments include a fuel cell and a battery bank to provide power (e.g., to aircraft avionics or other electrical systems) during an emergency power outage. The battery can supply power to the load (e.g. the critical components of an aircraft via an aircraft essential bus) instantaneously to satisfy these regulations.

The battery bank can also supply the power needed to drive the compressor of the fuel cell system on start-up. As the compressor spools up and supplies air to the fuel cell, power delivery to the load and motor driving the compressor is transitioned from the battery to the fuel cell. Embodiments can satisfy regulations relating to speed of start-up power delivery and provides a method to start the fuel cell from cold soak. Embodiments include a method to deliver instantaneous power from the combined battery and fuel cell system to a load.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. An emergency power unit system for an aircraft, comprising:
   a fuel cell system configured to generate power using a fuel and an oxidant and to supply electrical power to an aircraft electrical bus in at least a fuel cell operational mode; and
   an electrical storage operatively connected to the aircraft electrical bus and directly connected to the fuel cell system to provide electrical power to the aircraft electrical bus and to the fuel cell system in at least a fuel cell start up mode;
   wherein the electrical storage is a standalone electrical storage isolated from a main aircraft battery system.

2. The emergency power unit system of claim 1, wherein, in the fuel cell start up mode, the electrical storage is configured to instantaneously provide electrical power to the aircraft electrical bus and to instantaneously provide electrical power to a starter motor of the fuel cell system to start the fuel cell system.

3. The emergency power unit system of claim 2, wherein the fuel cell system further comprises:
   a fuel cell fluidly connected to an oxidizer supply line to receive the oxidant; and
   a compressor configured to receive the oxidant and compress the oxidant upstream of the fuel cell;
   wherein the starter motor of the fuel cell system is operatively connected to the compressor to drive the compressor for a first duration, wherein the first duration is a duration for the compressor to start and reach operational speed.

4. The emergency power unit system of claim 3, wherein, in the fuel cell operational mode, only the fuel cell system is configured to supply electrical power to the aircraft electrical bus.

5. The emergency power unit system of claim 4, wherein, in a parallel mode, after the first duration is reached, the electrical storage and the fuel cell system are configured to provide electrical power to the aircraft electrical bus in parallel for a second duration.

6. The emergency power unit system of claim 5, further comprising a switching module configured to switch between the fuel cell start up mode, the fuel cell operational mode, and the parallel mode.

7. The emergency power unit system of claim 6, wherein, to switch from the fuel cell start up mode to the fuel cell operational mode, the emergency power unit system is configured to disconnect the electrical storage from the aircraft electrical bus when the first duration is reached so that only the fuel cell system provides power to the aircraft electrical bus.

8. The emergency power unit system of claim 6, wherein, to switch from the fuel cell start up mode to the parallel mode, the emergency power unit system is configured to continue to provide power to the aircraft electrical bus with the electrical storage while also providing power to the aircraft electrical bus with the fuel cell system, regardless of whether the second duration is reached.

9. The emergency power unit system of claim 6, wherein, to switch from the parallel mode to the fuel cell operational mode, the emergency power unit system is configured to disconnect the electrical storage from the aircraft electrical bus when the second duration is reached so that only the fuel cell system provides power to the aircraft electrical bus.

10. The emergency power unit system of claim 1, wherein the electrical storage is a battery.

11. The emergency power unit system of claim 10, wherein the battery is smaller than a main aircraft battery.

12. The emergency power unit system of claim 1, further comprising an oxidizer supply system fluidly connected to the fuel cell system to supply the oxidant to the fuel cell system via an oxidant supply line.

13. The emergency power unit system of claim 12, further comprising a fuel supply system fluidly connected to the fuel cell system to supply the fuel to the fuel cell system via a fuel supply line, wherein a fuel cell is fluidly connected to the fuel supply line to receive the fuel.

14. The emergency power unit system of claim 1, further comprising a thermal management system in thermal communication with the fuel cell system to divert heat from the fuel cell system to the thermal management system.

15. A method, comprising:

supplying power from an electrical storage to an aircraft electrical bus; and directly supplying power from the electrical storage to a fuel cell system to power the aircraft electrical bus and the fuel cell system before supplying power to the aircraft electrical bus with only the fuel cell system;

wherein the electrical storage is a standalone electrical storage isolated from a main aircraft battery system.

16. The method of claim 15, further comprising switching between a fuel cell start up mode, a fuel cell operational mode, and a parallel mode as a function of a state of the fuel cell system.

17. The method of claim 16, wherein switching from the fuel cell start up mode to the fuel cell operational mode includes disconnecting the electrical storage from the aircraft electrical bus when the state of the fuel cell system is fully operational so that only the fuel cell system provides power to the aircraft electrical bus.

18. The method of claim 16, wherein switching from the fuel cell start up mode to the parallel mode includes continuing to provide power to the aircraft electrical bus with the electrical storage while also providing power to the aircraft electrical bus with the fuel cell system when the state of the fuel cell system is between start up and operational.

19. The method of claim 16, wherein switching from the parallel mode to the fuel cell operational mode includes disconnecting the electrical storage from the aircraft electrical bus when the state of the fuel cell system is operational so that only the fuel cell system provides power to the aircraft electrical bus.

20. The method of claim 16, wherein the electrical storage is a battery.

* * * * *